United States Patent [19]

Le Dieu et al.

[11] 4,320,501

[45] Mar. 16, 1982

[54] MULTIPLEX SPACE SWITCH

[75] Inventors: Bernard Le Dieu; Georges Thiebaut, both of Perros Guirec, France

[73] Assignee: Compagnie Industrielle des Telecommunications Cit-Alcatel, Paris, France

[21] Appl. No.: 89,392

[22] Filed: Oct. 30, 1979

[30] Foreign Application Priority Data

Oct. 30, 1978 [FR] France .............................. 78 30715

[51] Int. Cl.³ ............................................ H04Q 11/04
[52] U.S. Cl. ....................................... 370/63; 370/59; 370/64; 370/68
[58] Field of Search ......................... 370/63, 59, 68, 64

[56] References Cited

U.S. PATENT DOCUMENTS

| 3,263,030 | 7/1966 | Stiefel | 370/66 |
| 3,573,381 | 4/1971 | Marcus | 370/68 |
| 4,074,077 | 2/1978 | Charransol | 370/63 |

FOREIGN PATENT DOCUMENTS 2819126  3/1979  Fed. Rep. of Germany ......... 370/59

OTHER PUBLICATIONS

Fujitsu Scientific & Technical Journal; Sep. 1977; "An Adaptive Type PCM Transit Switching Network" by Tsuda et al., pp. 1–22.
International French Seminar on Digital Communications; Mar. 1976; "Limitation of Transmission Rate . . ." by Pfanschmidt, pp. C3.1 to C3.6.
IEEE International Conference on Communications; Jun. 1977; "No. 3 EAX Network and Master Clock", pp. 27.2-199 to 27.2-203.

Primary Examiner—David L. Stewart
Attorney, Agent, or Firm—Kenyon & Kenyon

[57] ABSTRACT

The space switch has an inlet series to parallel converter (1) arranged to take sequential data from the i-th time slot of each of a plurality of synchronized inlet multiplexes and apply them simultaneously to a parallel connection (11) within one time slot period. These time slots are written into one of two signal stores (2 and 3), e.g. sequentially. A control store (4) controls the order in which data is read from the signal store and re-assembled into outlet multiplexes by a parallel to series converter (5), thereby performing space switching between the stored time slots. The signal stores alternate between reading and writing, and each has a capacity equal to the product of the number (p) of inlet multiplexes (E1, . . . Ep) multiplied by a submultiple of the number of time slots to a frame. When the submultiple is greater than 1 there is a possibility of limited time switching within a sector of successive time slots, the number of time slots in each sector being equal to the submultiple.

1 Claim, 4 Drawing Figures

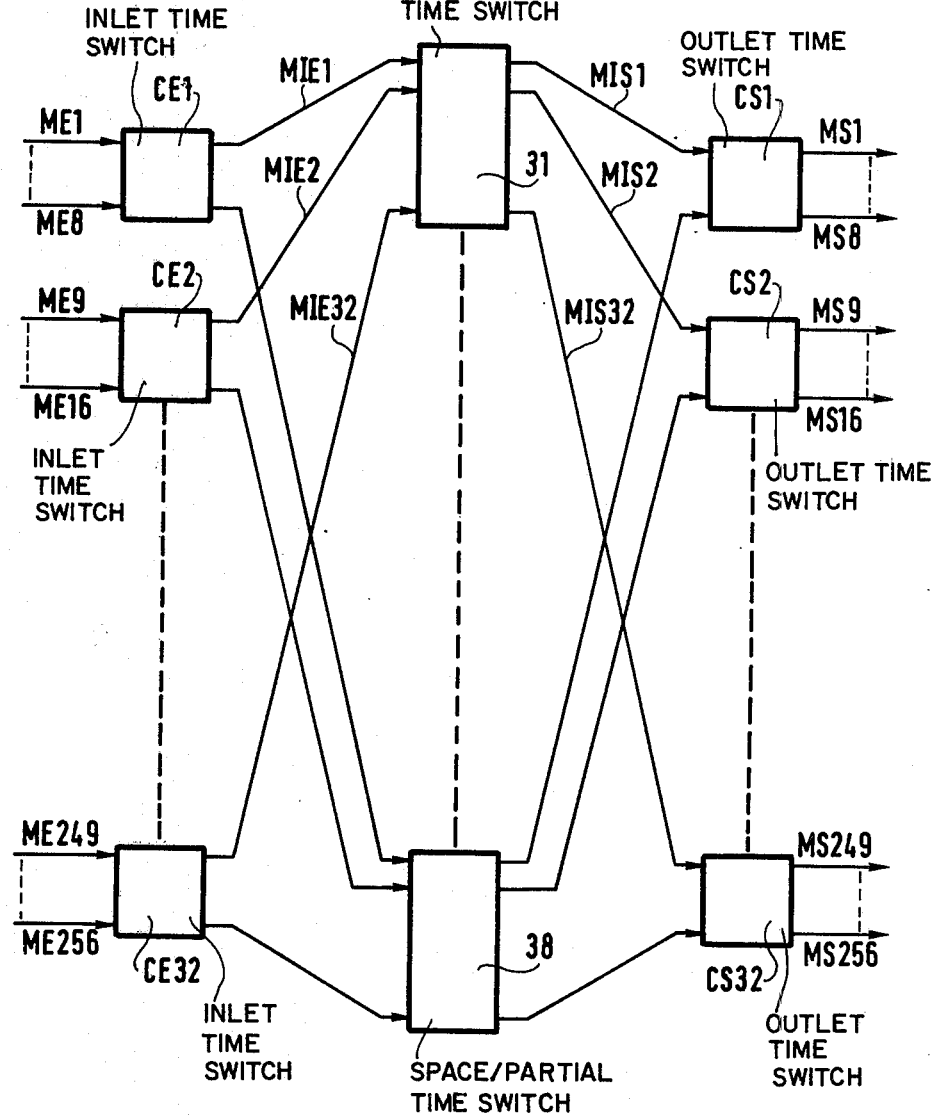

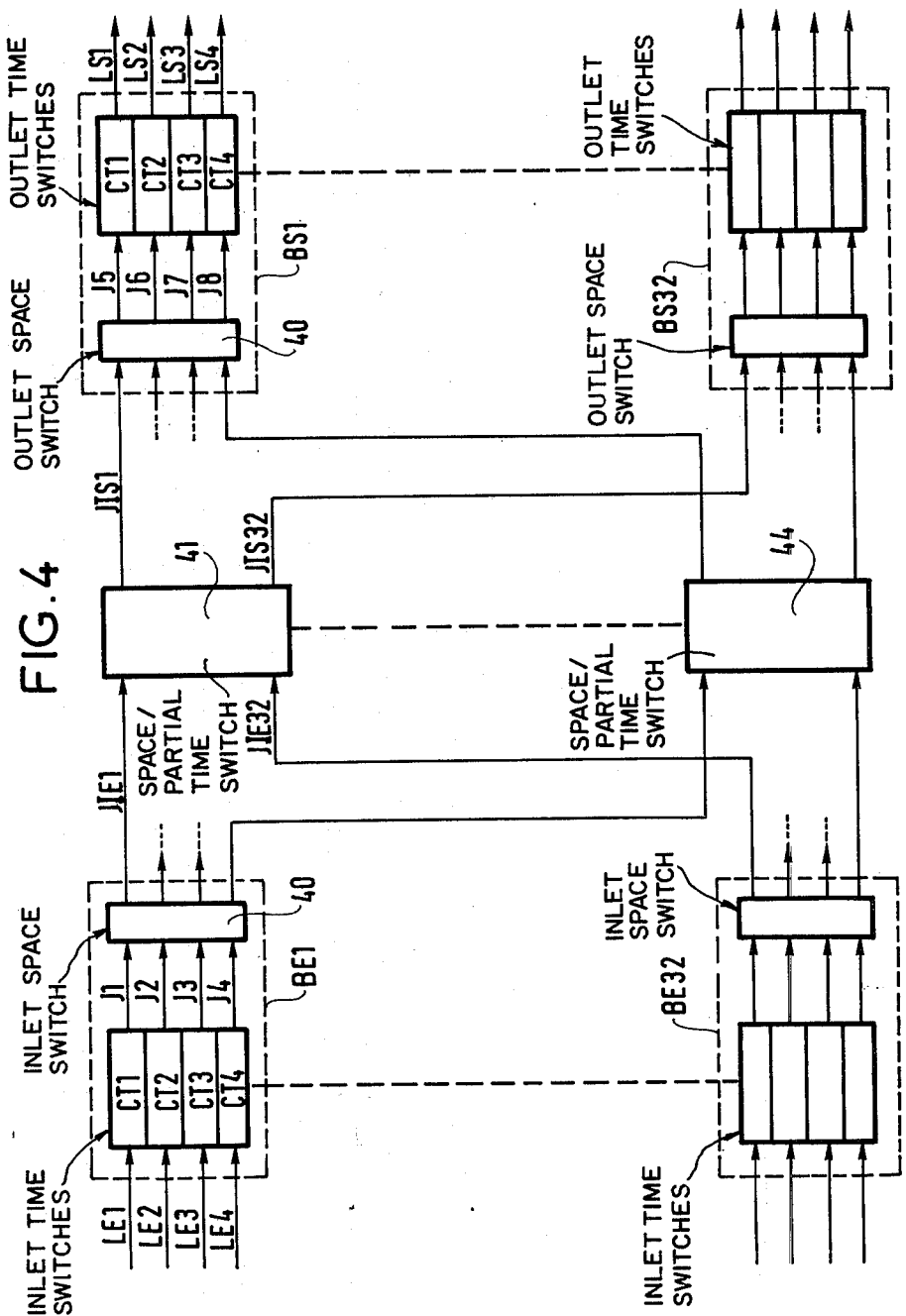

MULTIPLEX SPACE SWITCH

The present invention relates to a multiplex space switch for a time division switching network using pulse code modulation (PCM); such switching networks enable a recurring time slot in an inlet multiplex to be connected to any recurring time slot in an outlet multiplex, where the said multiplexes are synchronous, in phase and have identical frames each comprising a given number of time slots.

The invention is particularly applicable to time-space-time switching networks, i.e. having a space stage included between two time stages; the invention is also applicable to any symmetrical switching network (TST, TSSST, STS etc).

French Pat. No. 2224 961 discloses TST and TSSST types of switching network, i.e. having an inlet time stage and an outlet time stage surrounding one or more space stages.

Each inlet time stage and outlet time stage is constituted by time switches, while each space stage is constituted by space switches. Each time switch of the inlet stage is connected via multiplexes to each space switch of the space stage that follows it, and each time switch of the outlet stage is connected via multiplexes to each space switch of the preceding stage.

In a TST structure there is only one space stage, each switch of which is connected to each of the inlet and outlet time switches. In a TSSST structure, a central space stage is included between two space stages; each space switch of the central space stage is connected to each of the space switches of the space stages on either side of it.

Generally, a p inlet and q outlet multiplex space switch or stage connects, in real time, an i-th inlet time slot arriving on any one of the inlet multiplexes to an i-th outlet time slot of any one of the outlet multiplexes. In other words, supposing each time slot to be constituted by one byte, this implies that the bytes to be switched are imprisoned in their time slot number and can only change multiplex; the space stage thus operates in time alignment since it does not provide for time slot changing, but only for the switching of an inlet multiplex time slot to the same number time slot of any one of the outlet multiplexes. Conventionally, the implementation of a multiplex space switch is performed using q sets of AND-OR gates. Each set of AND-OR gates comprises p two-input AND gates with one input of each AND gate connected to a respective one of the inlet multiplexes and the other input receiving, from a control memory, an addressing signal common to all the AND gates of the set; the p outputs of the AND gates of the same set each connected to a respective input of the OR gate of the said set, and the output of the OR gate is connected to one of the outlet multiplexes. Thus, supposing it is desired to connect inlet multiplex No. 1 to outlet multiplex No. q during time slot period i, it is sufficient to open the first AND gate of the q-th set at the moment when the i-th time slot is present on the number 1 inlet multiplex, the first AND gate of each set being connected to the number 1 inlet multiplex.

In such a multiplex space switch, the control store delivers addresses sequentially and it is necessary to use buffer registers for simultaneous addressing of the AND gates of the q sets of AND-OR gates.

These registers considerably increase the price of the control memory, and also its bulk. A further drawback is the fact that the AND-OR gates are at present limited to 16 inputs, and thus to 16 multiplexes, which makes it necessary to group AND-OR gates to make up an assembly capable of exceeding a 16 multiplex capacity.

Further, the TST, TSST, TSSST etc. type switching networks used in practice have some degree of blocking.

Reducing the level of blocking in a switching network, and perhaps eliminating it altogether, requires a larger number of multiplex space switches, and hence higher costs and greater bulk.

For example, for an 8,000 subscriber exchange, a TST switching network comprises 32 time switches in the inlet stage and as many in the outlet stage, with each inlet time switch being connected to eight inlet multiplexes of 32 time slots per frame, and each outlet time switch being connected to eight outlet multiplexes of 32 time slots per frame. The space stage is a square $32 \times 32$ matrix, i.e. its inlet side is connected to each switch in the inlet stage and its outlet side is connected to each switch in the outlet stage; the matrix is constituted by 8 sub-matrices, each of which is connected via a multiplex to each switch in the outlet and inlet stages.

The outlet of each inlet time switch has eight 32 time slot multiplexes, each assigned to a respective one of the submatrices of the space stage; the inlet of each outlet time switch has eight 32 time slot multiplexes, each assigned to a respective one of the space stage sub-matrices. Space switching is performed only between multiplexes assigned to the same sub-matrix. This organisation makes it possible to perform space switching at relatively low speed, e.g. 2 Megabits a second.

Such a network has a relatively high level of blocking of $5.4 \times 10^{-2}$ for a traffic density of 0.85 erlangs. It is known that to reduce the blocking, it is necessary to increase the space stage, i.e. its number of matrices, which in addition to increasing the network volume, also leads to the implementation of a very high capacity space stage, thus one that is difficult to implement and whose cost is considerably increased.

A second example concerns a 60,000 subscriber exchange with a switching network of the T S1 S2 S3 T type; the inlet and outlet time stages are each constituted by 128 time switches, each of which is connected to sixteen 32 time slot multiplexes, the inlet stage being connected to inlet multiplexes and the outlet stage being connected to outlet multiplexes. The first space stage comprises thirty-two $4 \times 4$ matrices, i.e. matrices having four inlets and four outlets, each inlet being connected to one inlet switch and each outlet to a matrix of the second space stage which comprises four $32 \times 32$ matrices. Each matrix of the second space stage is connected to one output from each of the matrices of the first space stage. On the output side each matrix is connected to each of the matrices of the third space stage which comprises thirty-two $4 \times 4$ matrices. Each matrix outlet from the third space stage is connected to one of the time switches of the outlet stage.

Such a network has an average blocking level of $5 \times 10^{-3}$ at a traffic density of 0.85 erlangs.

If it is desired to reduce the blocking of this type of switching network, it is necessary to change the type of matrix used in the first and the third space stages, and to make a corresponding increase in the number of matrices in the second space stage. With thirty-two $4 \times 7$ matrices in the first space stage S1, thirty-two $7 \times 4$ matrices in the third space stage S3 and seven $32 \times 32$ matrices in the second space stage S2, the average blocking is about $1 \times 10^{-5}$ for a traffice density of 0.85 erlangs, which is only a small improvement; in contrast to the small improvement in blocking, there is a large increase in bulk and cost of equipment.

Preferred embodiments of the present invention provide a switch for use in providing a switching network which is more economical than these known solutions for a desirable level of blocking.

Preferred embodiments of the invention also reduce the level of blocking in a switching network without increasing the number of switches per stage.

The present invention provides a multiplex space switch having inlets and outlets for an equal number of time multiplexes, the said multiplexes being synchronous, in phase and having identical frames each including a plurality of time slots, wherein the multiplex space switch comprises a series to parallel converter, two signal stores, a control store, a group of AND-OR gates and a parallel to series converter, the said series to parallel converter being its inlets connected to inlet multiplexes and its outlet connected to both signal stores which are arranged to alternate so that one is in write mode while the other is in read mode and vice versa, each signal store comprising a number of words equal to the product of the number of inlet multiplexes multiplied by a sub-multiple of the number of time slots to a frame, and having its outlet connected to the inlet of the group of AND-OR gates, the said group of AND-OR gates having its outlet connected to the outlet multiplexes, and the control store comprising a number of words equal to the product of the number of inlt multiplexes multiplied by the number of time slots to a frame, and being connected to both of the said signal stores.

In the multiplex space switch in accordance with the invention, the i-th byte of the first inlet multiplex is stored in the first word of the signal store, the i-th byte of the second multiplex is stored in the second word of the signal store . . . ; and the i-th byte of the p-th multiplex is stored in the pth word of the signal store; to perform space switching, the words are read from the signal store and associated with the outlet multiplex in an order given by the control store. For example, if it is desired to connect the first inlet multiplex to the qth outlet multiplex, the qth word of the control store stores the data 1, i.e. the address of the first word of the signal store. Naturally the control store could be used instead to control the order used for writing into the signal store, with the store being read in an orderly manner.

Embodiments of the invention are described by way of example with reference to the accompanying drawings in which:

FIG. 3 shows a TST switching network applying the multiplex space switch of FIG. 2; and FIG. 4 shows a T 3S T switching network applying the multiplex space switches of FIGS. 1 and 2.

Figure 1:
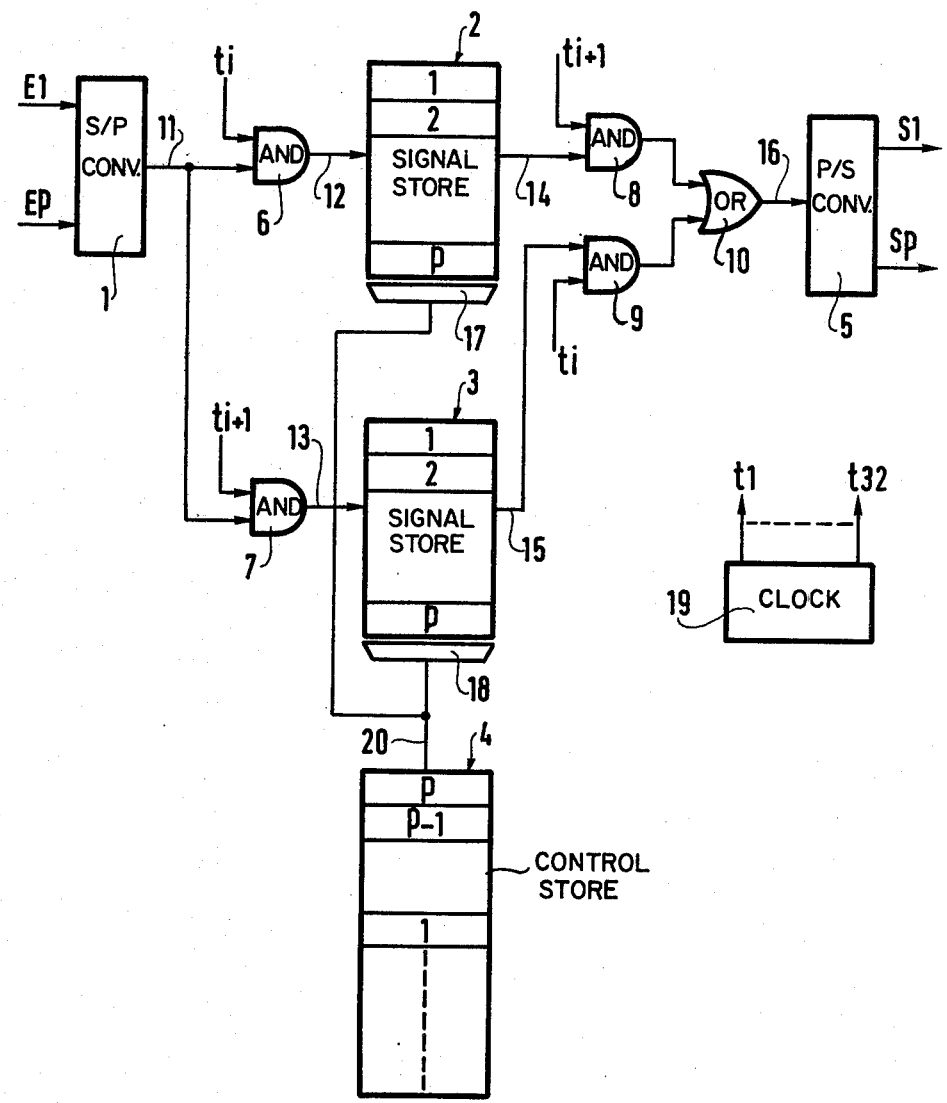
FIG. 1 shows a multiplex space switch in accordance with the invention for the case where the submultiple of the number of time slots in a frame is equal to 1.

FIG. 1 shows a multiplex space switch in accordance with the invention, 1 designates a series to parallel converter, 2 and 3 signal stores, 4 a control store, 5 a parallel to series converter, 6,7,8 and 9 groups of eight AND gates, and 10 a group of eight OR gates.

The inlet of the series to parallel converter 1 is connected to p inlet multiplexes E1, . . . Ep. The outlet of the parallel to series converter 5 is connected to p outlet multiplexes S1, . . . Sp. Each inlet or outlet multiplex comprises, for example, thirty-two time slots arranged in 125 micro-second frames. The outlet of the series to parallel converter 1 is connected via a multiplex 11 constituted by eight connections in parallel, both to the group of AND gates 6 and to the group of AND gates 7. The outlet of the group of AND gates 6 is connected via a multiplex 12 to the signal store 2; and the outlet of the group of AND gates 7 is connected via a multiplex 13 to the signal store 3. The multiplexes 12 and 13 are both constituted by eight connections in parallel.

The signal stores 2 and 3 are respectively connected to the groups of AND gates 8 and 9 via respective multiplexes 14 and 15 each constituted by eight connections in parallel. The outlets of the groups of AND gates 8 and 9 are connected to respective inlets of the group of OR gates 10, the outlet of the group of OR gates 10 being connected, via a multiplex 16 constituted by eight connections in parallel, to the inlet of the parallel to series converter 5. The control store 4 is connected to the respective read addressing circuits 17 and 18 of the signal stores 2 and 3 via an addressing line 20.

A time base 19 delivers clock periods t1 . . . t32 corresponding to the thirty-two time slots of the inlet multiplexes E1–Ep and of the outlet multiplexes S1 . . . Sp. Each of the groups of AND gates 6 and 9 has one inlet that receives clock periods ti from the time base 19, while the groups of AND gates 7 and 8 have one inlet receiving clock periods $t(i+1)$ in such a manner that on all occasions one of the signal stores is in write mode while the other is in read mode.

Each of the multiplexes 11,12,13,14,15 and 16 is constituted by eight connections in parallel, each connection conveying one bit of a byte that constitutes a time slot. In this way each multiplex conveys the p,i-th time slots of the p inlet multiplexes during a single clock period ti.

In FIG. 1, the sub-multiple of the number of time slots of a frame is one and each of the signal stores 2 and 3 has a capacity of p words, each word corresponding to one time slot byte; the p words are written in order, i.e. in the store 2 the first word contains the i-th time slot of the inlet multiplex E1, the second word contains the i-th time slot of the inlet multiplex E2, . . . , the p-th word contains the i-th time slot of the inlet multiplex Ep; the order is the same in the store 3, but it corresponds to the $(i+1)$th time slot since writing to the stores 2 and 3 is performed at clock periods ti and $t(i+1)$.

The control store 4 has a capacity of 32p words, corresponding to the total number of time slots in one frame of the p inlet multiplexes, each word containing the number of an inlet multiplex, and a group of p such words corresponding to the switching disposition for one time slot number in all the multiplexes.

FIG. 1 represents, for example, p words of the control store, these p words being those of the same time slot, e.g. the $(i+1)^{th}$; the first word contans the number p corresponding to inlet multiplex Ep, the second word contains the number $(p-1)$ corresponding to inlet multiplex $E(p+1)$, . . . , the p-th word contains the number 1 corresponding to inlet multiplex E1. The control store is read cyclically, the stores being read in the order given by the control store 4 whose successive words, which contain the numbers p, $(p-1)$, . . . for switching towards respective outlet multiplexes S1, S2, . . . Sp.

During clock period ti, the p,i-th time slots of the p inlet multiplexes are written in order into the signal store 2; during the same clock period the p words corresponding to the (i−1)th time slots and written during clock period t(i−1) are read from the signal store 3, and during clock period t(i+1), the store 2 is read while data is written into the store 3. In the example chosen for the control store, the i-th time slot of the inlet multiplex Ep is switched to the outlet multiplex S1, the i-th time slot of the inlet multiplex E(p−1) is switched to the outlet multiplex S2, the i-th time slot of the inlet multiplex E1 is switched to the outlet multiplex Sp. Naturally, the switching order may be different for each of the thirty-two slots of a frame.

In the example of FIG. 1, the time slots from the inlet multiplexes E1, E2,−,Ep appear successively on the multiplex 11 at the outlet of the series to parallel converter 1 in the order of their inlet multiplex number 1, 2, . . . ,p. These same time slots, in the present example of the contents of the control store 4, reappear on the outlet multiplex 16 in the reverse order p, (p−1), . . . , 1 and are attributed respectively to outlet multiplexes S1, . . . , S(p−1), Sp during clock period t(i+1). The output distribution of the following time slots (i.e. those arriving at the inlet to the stores at t(i+1), t(i+2) . . . etc. can be totally different, depending on the data in the control store 4.

In practice p is chosen to be 32 so that each multiplex comprises 32 time slots per frame and the control store comprises 1024 words of 5 bits each.

The memories used to constitute the signal stores are of a commercially available type having a capacity of 256 4-bit words—a capacity which is eight times greater than that which is strictly necessary. The control store currently used is also constituted of commercially available types of memory having a capacity of 256 words or a multiple of 256 words, i.e. in general, 4-bit or 8-bit words; since the control store only requires 5-bit words to address 32 words, 3 bits are left unused in practice. With this in mind, it is desirable to design a multiplex space switch which operates in such a way that it makes full use of the signal store and control store capacity thus made available.

If, for example, the capacity of the signal stores is eight times greater than that necessary to function as the space switch illustrated in FIG. 1, eight times as many words, i.e. eight times as many time slots, can be stored. The number of time slots to be switched in a frame still remains 1024 for 32 inlet multiplexes; however, since each word of the control store has 8 bits, of which only 5 bits are necessary to switch a time slot to one of the thirty two outlet multiplexes, the 3 extra bits can be used to choose one time slot from among the eight stored time slots of each inlet multiplex. In this way, time switching can be performed within a sector of eight time slots.

Figure 2:
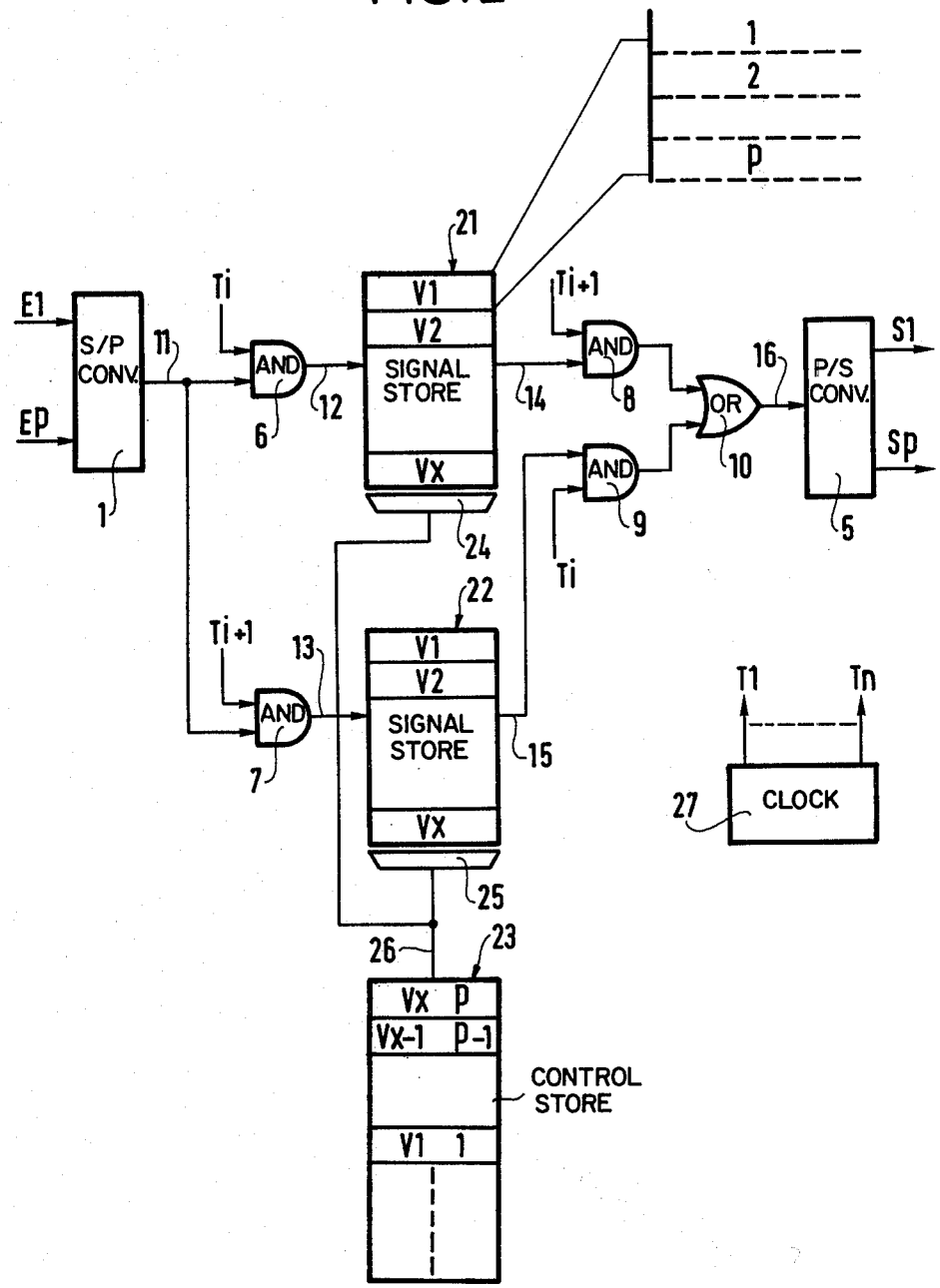
FIG. 2 shows a multiplex time switch in accordance with the invention for the case where the submultiple of the number of time slots in a frame is equal to 8.

FIG. 2 illustrates a multiplex space switch which makes it possible to perform time switching in a sector of x time slots; the structure of the multiplex space switch is the same as that of the switch in FIG. 1 and the same reference symbols designate the same parts therein.

In FIG. 2, 1 designates a series to parallel converter, 21 and 22 signal stores, 23 a control store, 5 a parallel to series converter, 6, 7, 8 and 9 groups of eight AND gates, and 10 a group of eight OR gates.

The inlet of the series to parallel converter 1 is connected to p inlet multiplexes E1, . . . Ep. The outlet of the parallel to series converter 5 is connected to p outlet multiplexes S1, . . . Sp. Each inlet or outlet multiplex comprises, for example, thirty-two time slots arranged in 125 micro-second frames. The outlet of the series to parallel converter 1 is connected via a multiplex 11 constituted by eight connections in parallel, both to the group of AND gates 6 and to the group of AND gates 7. The outlet of the group of AND gates 6 is connected via a multiplex 12 to the signal store 21; and the outlet of the group of AND gates 7 is connected via a multiplex 13 to the signal store 22. The multiplexes 12 and 13 are both constituted by eight connections in parallel.

The signal stores 21 and 22 are respectively connected to the groups of AND gates 8 and 9 via respective multiplexes 14 and 15 each constituted by eight connections in parallel. The outlets of the groups of AND gates 8 and 9 are connected to respective inlets of the group of OR gates 10, the outlet of the group of OR gates 10 being connected, via a multiplex 16 constituted by eight connections in parallel, to the inlet of the parallel to series converter 5. The control store 23 is connected to the respective read addressing circuits 24 and 25 of the signal stores 21 and 22 via an address line 26.

A time base 27 delivers a clock periods T1, . . . Tn each lasting for a time corresponding to x time slots, i.e. to a sector of x time slots, with a frame of thirty-two time slots being divided into n sectors of x time slots each, each signal store having a capacity of xp words of eight bits each, i.e. x time slots per inlet multiplex E1, . . . Ep; x being a submultiple other than 1 of the thirty-two time slots of a frame.

The control store 23 has a capacity of 32p words, each word containing the number of an inlet multiplex and the number of a time slot in the sector of x time slots within said inlet multiplex. The groups of AND gates 6 and 9 each have inputs which receive the Ti clock periods from the time base 27, the groups of AND gates 7 and 8 receiving the clock periods T(i+1), so that one store is in write mode while the other is in read mode.

The multiplexes 11,12,13,14,15 and 16 are each constituted by eight connections in parallel, each connection conveying one bit of a byte which constitutes a time slot; (in this way, during one clock period Ti, each multiplex conveys the xp time slots of one sector from the p inlet multiplexes). Each of the signal stores 21 and 22 has a capacity of xp words and is divided into x zones—one per time slot of a sector, the zones being referenced V1, V2, . . . ,Vx. Each zone includes p words in which the eight bits of the corresponding time slots of the p inlet multiplexes are written in order. The zone V1 of the store 21, corresponding, for example, to the first time slot of the sector in question therefore contains, in order, the time slot with the same number from each of the inlet multiplexes E1, E2, . . . ,Ep; the same applies to the zones V2, . . . Vx, the x time slots being written during clock period Ti. The order in which the time slots are written in the signal store 22 is the same, but it corresponds to clock period T(i+1).

The control store 23 has a capacity of 32p words. FIG. 2 shows, by way of example, p words of the control store which, at clock period T(i+1), will read p words of the store 21. Each word of the control store includes the number of the zone to be read from the signal store 21 and the number of the word in the zone; thus, in the first word of the control store, the zone Vx and the number p are found; in the second word, the zone V(x−1) and the number (p−1), . . . , in the last word, the zone V1 and the number 1. Reading these p words will give an output of the first time slot sector on the outlet multiplexes S1, S2, . . . S(p−1), Sp; so there will be: on the outlet multiplex S1, the time slot x of the inlet multiplex Ep; on the outlet multiplex S2, the time slot (x−1) of the inlet multiplex E(p−1); . . . ; on the outlet multiplex Sp, the time slot 1 of the inlet multiplex E1. These are, of course, merely examples.

The control store 23 then controls the reading of p other words in the signal store 21, still during the clock period T(i+1). In all, the control store addresses the signal store 21 x times during the clock period T(i+1), using p words each time. It is quite obvious that each time the signal store 21 is addressed by the control store, the p words will be read in a different order so that during clock period T(i+1), all of the xp words of the store 21 are read. During clock period T(i+1), xp words are written in the signal store 23, and are read during clock period T(i+2).

The control store therefore contans xp words per sector; a frame is constituted by 32 words and there are n sectors per frame; so the control store has a capacity of nxp words, where nx=32.

Hereinabove, it is assumed, by way of example, that the signal stores 21 and 22 are used for switching during read mode, writing being performed in a given order; of course, writing could be controlled by the control store 23, with reading then being performed in a given order, i.e. in the same order as the words. The signal stores would still be divided into zones V1, V2, . . . ,Vx, each zone corresponding to one time slot of a sector and including p words; each word of the control store would still contain the number of a zone and the number of a word in said zone corresponding to an outlet multiplex. Both these ways of controlling a store are conventional and well known to the person skilled in the art.

The multiplex space switch of FIG. 2 is therefore a switch capable of a limited amount of time cross connection since a time slot can only be changed within a sector. 256 word, 4-bits per word memories are commercially available and suitable for constituting stores that are required to store 8 bit words. Further, if the number p of inlet and outlet multiplexes is set to 32, one store can store 8 time slots from each inlet multiplex, giving four sectors 8 time slots each per frame. The control store must have 32×32=1024 words. Since 5 bits are necessary to address the signal stores to select one multiplex address out of thirty-two, and since one time slot needs to be addressed out of eight, requiring three more bits, each word of the control store thus needs to contain eight bits. The control store can be made from a single 1024 word, 8 bits per word memory or from a plurality of 256 word, 8 bits per word memories. More generally, the number of sectors may be other than four, provided the signal store capacity matches the number of time slots to be stored and provided each word of the control store includes enought bits to store a zone number and the number of the word to be addressed in the signal store zone, whether the stores are controlled during writing or reading.

FIG. 3 shows an example of a time-space-time switching network having one space stage. The inlet time stage is constituted by thirty-two inlet time switches CE1, CE2, . . . ,CE32, and the outlet time stage is constituted by thirty-two outlet time switches CS1, CS2, . . . ,CS32. On its inlet side, each inlet time switch is connected to eight inlet multiplexes from a total of 256: ME1 to ME 256. On its outlet side, each outlet time switch is connected to eight outlet multiplexes from a total of 256, ME1 to ME 256. Each inlet and outlet multiplex has thirty-two time slots per frame.

The space stage is a 32×32 matrix constituted by eight sub-matrices 31, . . . 38, each having its inlet connected via an intermediate inlet multiplex MIE1, MIE2, . . . MIE32 to the outlet of each of the inlet time switches; each sub-matrix is of the type shown in FIG. 2 with the inlet multiplexes E1, . . . Ep replaced by the intermediate inlet multiplexes MIE1, MIE2, . . . MIE32. Each of the sub-matrices 31, . . . 38 has its outlet connected via 32 intermediate outlet multiplexes MIS1, MIS2, . . . MIS32 to each of the 32 outlet time switches; compared to FIG. 2 each of the intermediate outlet multiplexes replaces a corresponding outlet multiplex S1, . . . Sp. Each of the inlet and outlet time switches has a capacity of 256 time slots, supposing, as is generally the case, that the inlet multiplexes ME1, . . . ME256, and the outlet multiplexes MS1, . . . MS256 are constituted by frames having 32 time slots each. If the space stage was constituted by purely space sub-matrices, i.e. not having any time switching ability between the inlet and the outlet of these matrices, the network shown in FIG. 3 would have the relatively high blocking level of $5.4 \times 10^{-2}$ at a traffice density of 0.85 erlangs. It is well known, that to reduce this level of blocking, it would be necessary to increase the number of sub-matrices in the space stage thereby also requiring an increase in the number of outlets from the inlet time switches. In addition to the increased volume that such a solution would require, it would be more difficult and more expensive to implement such a higher capacity space stage.

By using stores to implement the sub-matrices of the space stage, and by providing time cross-connection between the time slots of an eight time slot sector, as described above, the level of blocking in the switching network shown in FIG. 3 drops to below $2 \times 10^{-7}$ for a traffic density or 0.85 erlangs.

FIG. 4 shows an example of a very large capacity switching network, of the time-space-space-space-time type, i.e. having three space stages between two time stages.

In this figure, BE1 to BE32, represent inlet blocks and BS1 to BS32 represent outlet blocks. The inlet and outlet blocks are idential to each other and each has a capacity of 2048 time slots. Each block comprises four time switches CT1 to CT4 each having a capacity of 512 time slots, and a space matrix 40 using stores and constituted by two space switches of the type shown in FIG. 1, i.e. incapable of time switching, for each time switch. The central space stage comprises four space sub-matrices 41 to 44, using stores and capable of limited time cross-connection, each sub-matrix being constituted by 16 space switches with stores of the type shown in FIG. 2, i.e. capable of time cross-connection of the time slots within an eight time slot sector.

Each time switch of an inlet block has its inlet connected to a respective one of four inlet lines LE1,LE2,LE3 and LE4, each constituted by 16 multiplexes, giving a total of 64 multiplexes per inlet block and a total of 2048 inlet multiplexes for the 32 inlet blocks.

Likewise, each time switch of an outlet block BS1 to BS32, has its outlet connected to a respective one of four outlet lines LS1, LS2, LS3 and LS4, each outlet line being constituted by 16 multiplexes; there are thus 64 outlet multiplexes at the outlet of each outlet block, giving a total of 2048 multiplexes for the 32 outlet blocks.

In each inlet block, the outlet of each time switch is connected via a respective multiplex junction J1, J2, J3 or J4, to the space matrix 40, each multiplex junction being constituted by 16 multiplexes having 32 time slots per frame. More precisely, each space switch of the type shown in FIG. 1 is connected via eight multiplexes to each time switch.

Each space sub-matrix 41 to 44 has its inlet connected via an intermediate inlet junction JIE1 to JIE32 to a corresponding outlet of each of the 32 inlet blocks; each sub-matrix is also connected at its outlet via an intermediate outlet junction JIS1 to JIS32 to an inlet of each of the 32 outlet blocks. Each intermediate junction, whether on the inlet side or the outlet side, is constituted by 16 multiplexes of thirty-two time slots per frame. More precisely, each intermediate inlet junction is constituted by two groups of eight multiplexes, each group coming from each of the space switches of a space matrix 40 in an inlet block, and each multiplex space switch of one sub-matrix being connected to one multiplex of each intermediate inlet junction. Likewise, each intermediate outlet junction is constituted by two groups of eight multiplexes, each group terminating at the inlet to a space switch of the matrix 40 of an outlet block; each intermediate outlet junction is thus constituted by an outlet multiplex from each multiplex space switch.

In one outlet block, each outlet from the space matrix 40 is connected via a respective one of multiplex junction J5, J6, J7 and J8 to the inlet of each time switch, each multiplex junction being constituted by 16 multiplexes of 32 time slots per frame. More precisely, each multiplex junction is constituted by two groups of eight multiplexes, each group coming from one space switch of the space matrix 40.

In the switching network of FIG. 4, the space matrices 40 of the inlet blocks constitute the first space stage, and the space matrices 40 of the outlet block constitute the third stage, the sub-matrices 41 to 44 constituting the second space stage.

If the space stages were constituted by purely space matrices and sub-matrices, i.e. not providing any capability for changing time slots between their inlets and their outlets, the switching network of FIG. 4 would have a blocking level of $5 \times 10^{-3}$ for a traffic density of 0.85 erlangs. To reduce the blocking, the modification of the matrices and the submatrices, together with the increase in the number of submatrices, e.g. using $4 \times 7$ matrices in the inlet blocks, and $7 \times 4$ matrices in the outlet blocks and using seven $32 \times 32$ sub-matrices in the second space stage would reduce the blocking to $10^{-5}$; using a second space stage with sub-matrices constituted by the switch having stores and capable of limited time cross-connection over a sector of eight time slots, the blocking is less than $10^{-8}$, for a traffic density of 0.85 erlangs. The reduction in blocking is large, and this is obtained without any requirement for increasing the number of sub-matrices in the second space stage, and also with a very small requirement for increasing the equipment used in the implementation of the sub-matrices. Another advantage is that the three space stages use the same type of equipment.

The multiplex space switch is thus applicable in all fields where space switching is to be performed, and in particular in telecommunications; an important application is in switching networks and more particularly, but not exclusively, in telephone exchange switching networks.

Naturally the invention is not limited to the embodiments described and shown, and in particular it would be possible to use stores of capacities other than those mentioned for the space switches.

We claim:

1. A multiplex space switch for connecting a plurality p of inlet time division multiplexes to an equal plurality p of outlet time division multiplexes, said inlet and outlet multiplexes being synchronized and in phase and having identical multiple time slot frames, each time slot carrying a binary word having an equal plurality of bits in sequence, wherein the multiplex space switch comprises:

a series to parallel converter having p series inlets for connection to p corresponding inlet multiplexes and a number of parallel outlets equal to the number of bits in a time slot;

two signal stores, each signal store comprising a number of words equal to the product of p multiplied by a sub-multiple x of the total number of time slots in a frame, x being an integer other than one, each frame being divided into n sectors of x time slots per sector, and each signal store being divided into x zones of p words per zone;

a control store comprising nxp words, each word in the control store including an address for one of the p words in any zone and an address for one of said x zones in a signal store;

a Parallel to series converter having a number of parallel inputs equal to the number of bits in each time slot and p series outlets for connection to p corresponding outlet multiplexes; and means for operatively connecting the parallel outlets of the series to parallel converter, the parallel inlets of the parallel to series converter, and the control store to both signal stores for alternately reading data from the inlet multiplexes into one signal store while writing data from the other control store into the outlet multiplexes, and vice-versa, the period for each alternate read/write phase being equal to x time slots, whereby the multiplex space switch may perform changes in time slot between the inlet and outlet multiplexes within a given frame sector, in addition to space switching.

* * * * *

UNITED STATES PATENT AND TRADEMARK OFFICE
CERTIFICATE OF CORRECTION

PATENT NO. : 4,320,501

DATED : March 16, 1982

INVENTOR(S) : Bernard Le Dieu et al.

It is certified that error appears in the above—identified patent and that said Letters Patent is hereby corrected as shown below:

Column 1, line 54: after "set" insert --are--.

Column 3, line 20: change "being" to --having--.

Column 4, line 60: change "contans" to --contains--.

*Signed and Sealed this*

*Twenty-fourth* Day of *August 1982*

[SEAL]

*Attest:*

GERALD J. MOSSINGHOFF

*Attesting Officer*     *Commissioner of Patents and Trademarks*